INVENTOR
Walter Krämer

Feb. 18, 1964 W. KRÄMER 3,121,361
SHEARING MACHINE WITH ROTATING AND TRANSLATING BLADES
Filed Sept. 13, 1960 3 Sheets-Sheet 2
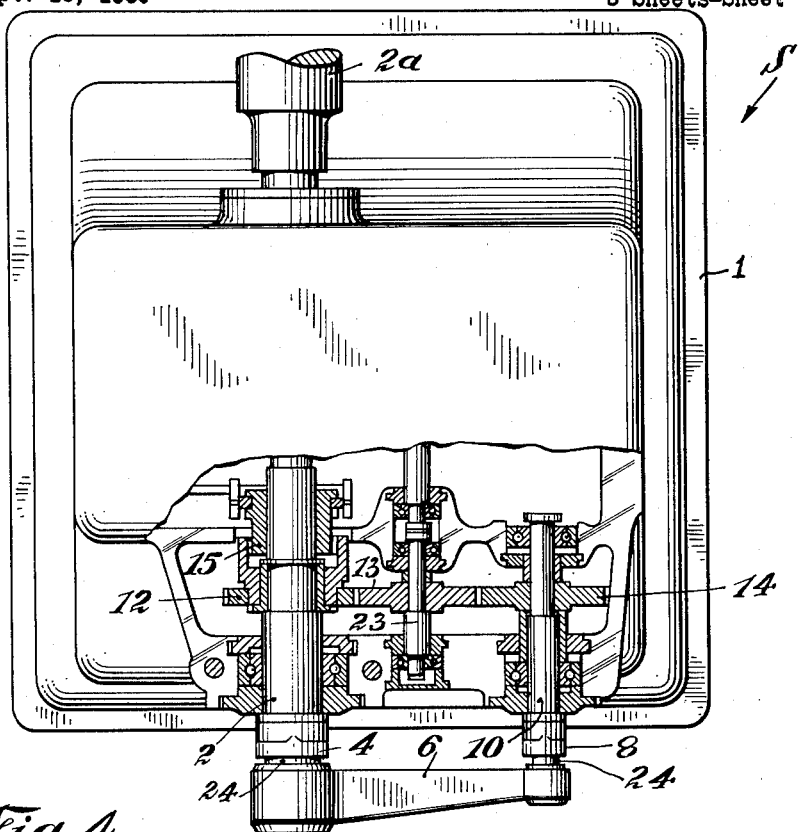
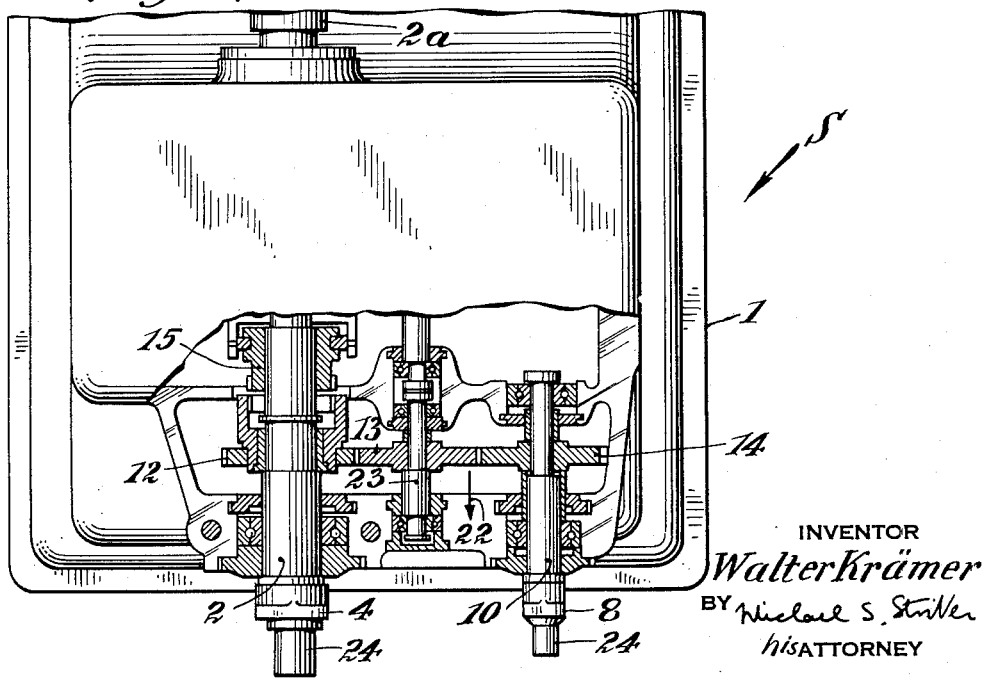
INVENTOR
Walter Krämer
BY Michael S. Striker
his ATTORNEY Feb. 18, 1964   W. KRÄMER   3,121,361
SHEARING MACHINE WITH ROTATING AND TRANSLATING BLADES
Filed Sept. 13, 1960   3 Sheets-Sheet 3
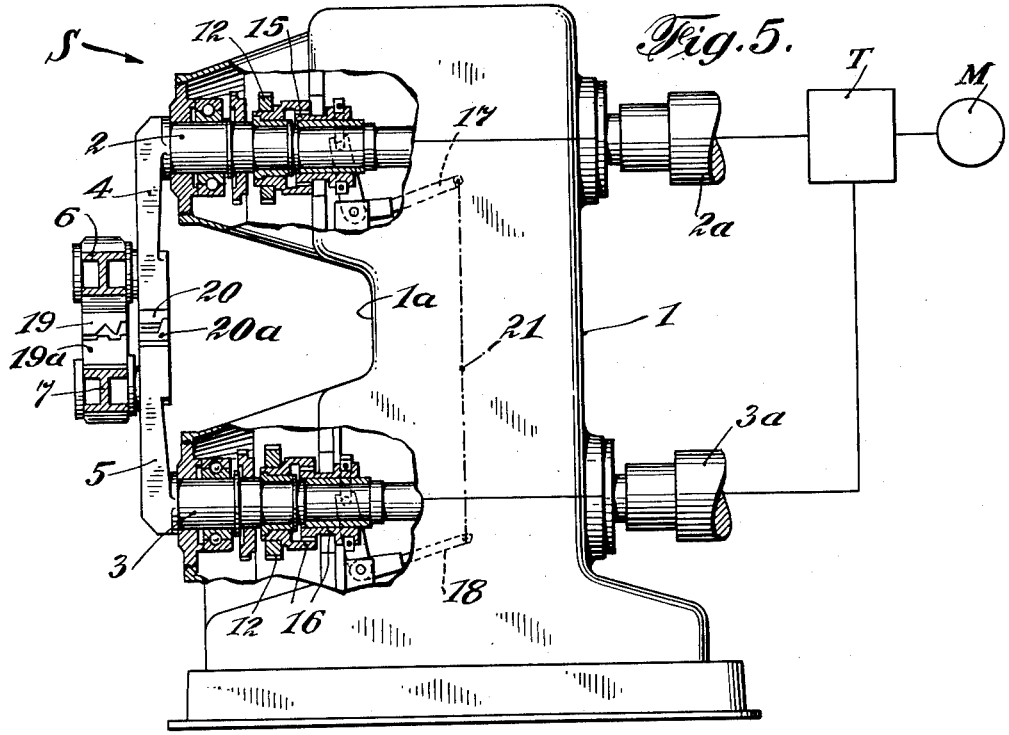
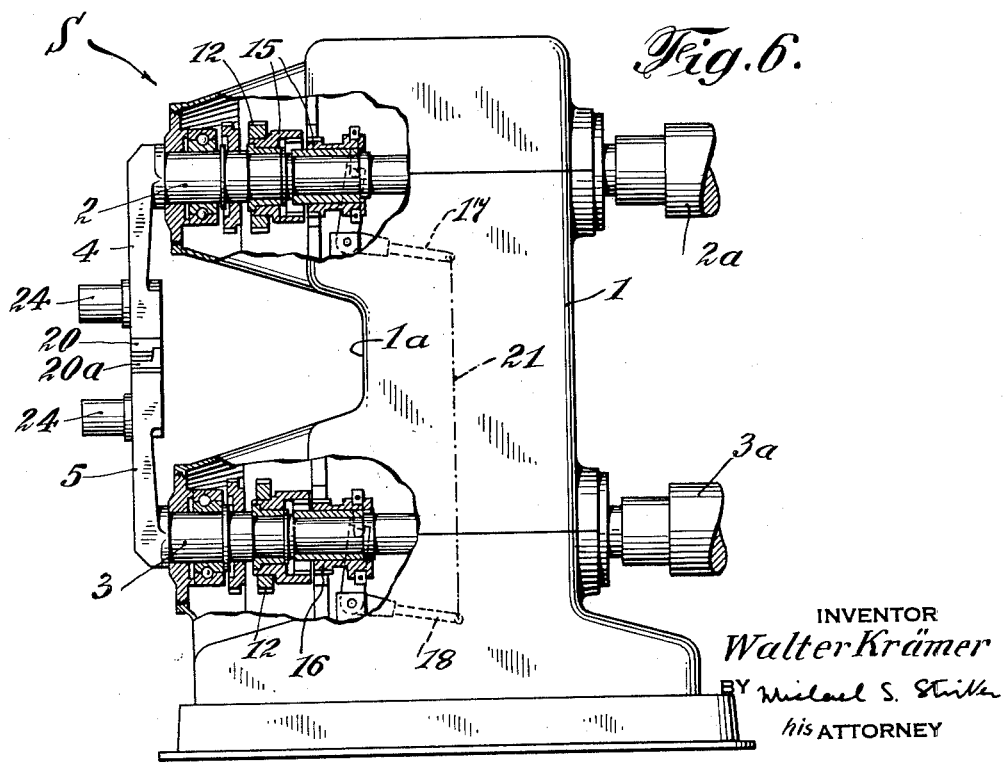
INVENTOR
Walter Krämer
BY Michael S. Striker
his ATTORNEY

United States Patent Office 3,121,361
Patented Feb. 18, 1964

3,121,361
SHEARING MACHINE WITH ROTATING AND TRANSLATING BLADES
Walter Krämer, Dahlbruch, Westphalia, Germany, assignor to Siemag Siegener Maschinenbau G.m.b.H., Dahlbruch, Westphalia, Germany
Filed Sept. 13, 1960, Ser. No. 55,784
Claims priority, application Germany Sept. 17, 1959
9 Claims. (Cl. 83—315)

The present invention relates to shearing machines in general, and more particularly to a machine for the shearing of flat and/or profiled rolled sections in rolling mills and the like.

The shearing machines of the class to which the machine of my invention belongs are frequently utilized in the rolling lines of mills used for the rolling of comparatively light sections wherein the freshly rolled sections passing the last stand of the rolling line must be cut to a given length, i.e. either to such a length that they may be placed into the cooling bed or to a length which is customary for storage and marketing. As a rule, the cutting knives or shears of such machines are maintained in idle position and are set in motion only when a transverse cut is to be made through the advancing rolled section. The shearing arrangements of this general character are also known as flying cutoffs. If the rolling line is constructed in such a way that it may perform a series of different rolling operations, i.e. if its rolling schedule is rather extensive, the forward speed and the cross-sectional areas of the sections produced in such lines will vary within very wide ranges. Therefore, it was considered necessary to provide in such rolling lines at least two shearing machines one of which was used for the cutting of sections with a cross-sectional area of up to a given magnitude and the other of which was used for cutting of sections whose cross-sectional area exceeded such given magnitude. Of course, the initial and maintenance costs of two separate shearing machines add considerably to the overall cost of such rolling mills. In addition, two separate machines occupy space which could be used for other purposes, and the alternating operation of two machines brings about substantial losses in time.

An important object of the present invention is to provide a shearing machine which may be utilized for the cutting of all types of rolled sections regardless of the cross-sectional areas of the sections.

Another object of the invention is to provide a shearing machine of the just outlined characteristics which requires less power when used for the cutting of light sections but which can develop substantial power for the cutting of heavier sections.

A further object of the invention is to provide a machine which may be rapidly and conveniently adapted for the cutting of differently dimensioned and configurated rolled sections.

An additional object of the instant invention is to provide a shearing machine of the above described type which is equally useful for the cutting of flat or profiled sections, which is of comparatively simple construction, which occupies little space, and which may be readily installed in all types of rolling mills without requiring any changes in the setup of such installations.

A concomitant object of the present invention is to provide a shearing machine which may be driven at variable rates of speed and which, if desired, may simultaneously perform more than one shearing operation.

With the above objects in view, the invention resides in the provision of a shearing machine for moving workpieces, particularly for rolled sections in rolling mills, which comprises a frame, two parallel motion mechanisms mounted on the frame at the opposite sides of a moving workpiece, at least one cutter connected to each parallel motion mechanism, and means for operating said parallel motion mechanisms in opposite directions. More particularly, each parallel motion mechanism comprises a pair of preferably parallel links which are mounted on rotary shafts provided in the machine frame, and a connecting link which is releasably secured to the free ends of the parallel links. One of the parallel links in each parallel motion mechanism carries a substantially radially extending cutter, and these cutters cooperate to form a transverse cut in a workpiece moving therebetween when the respective shafts are driven in opposite directions. For such cutting operation of normally light sections, the connecting links may be separated from the other links because the mass of the two cutter-carrying links is sufficient to form a good transverse cut. However, when it is desired to form transverse cuts in comparatively heavy sections, i.e. in sections with rather large cross-sectional areas, the connecting links are secured to the other two links of each parallel motion mechanism and each thereof carries a cutter so that these cutters cooperate to form a transverse cut in the heavy workpiece when the shafts of the parallel links are rotated in directions to move the connecting links in parallelism with themselves and toward the opposite sides of the workpiece which moves therebetween. The cutters mounted on the connecting links only perform a movement in directions toward and away from the workpiece, especially since the parallel motion mechanisms are preferably operated in such a way that the peripheral speeds of the cutters equal the forward speed of the workpiece.

According to another feature of my invention, only one shaft connected with each parallel motion mechanism must be positively driven, e.g. by an electric motor or another power source, and suitable transmissions are provided for rotating the other shaft of each mechanism. Furthermore, it is preferred to provided suitable clutch assemblies enabling an operator to disconnect the drive shafts of the parallel motion mechanisms as soon as a cutting operation is completed and as soon as the cutters are moved from the path of the workpiece.

Since the rolled sections are normally caused to move in a horizontal path, one parallel motion mechanism is disposed adjacent to the underside and the other adjacent to the upper side of the advancing rolled section.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 3 is a top plan view of the shearing machine shown in FIG. 1 with certain parts broken away to reveal the means for driving the upper shafts;

FIG. 4 is a similar top plan view of the machine when assembled in the manner as illustrated in FIG. 2;

Figure 1:
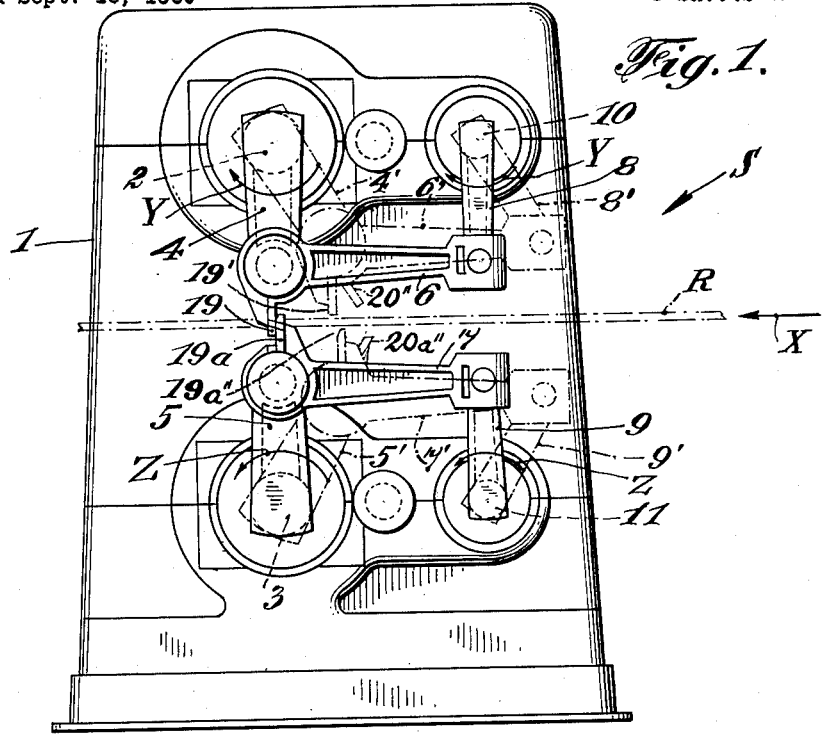
FIG. 1 is a somewhat schematic front elevational view of the improved shearing machine as utilized for the cutting of rolled sections with large cross-sectional areas.
Figure 2:
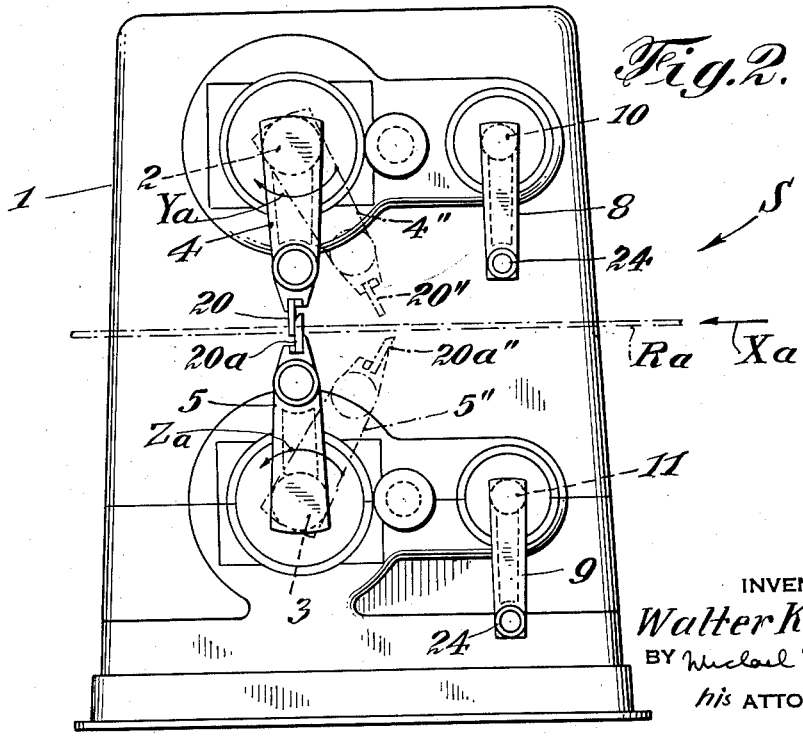
FIG. 2 is a similar front elevational view of the machine as utilized for the cutting of light sections.

FIG. 5 is an end elevational view of the shearing machine as seen from the right-hand side of FIG. 1, with certain parts broken away to illustrate the clutches for the upper and lower drive shafts in operative position during an actual cutting or shearing operation; and FIG. 6 is a similar end elevational view of the machine shown in FIG. 2, with certain parts broken away to show both clutches in idle position.

Referring now in greater detail to the illustrated embodiment, and first to FIG. 1, there is shown a shearing machine S which comprises a frame or housing 1 rotatably supporting two vertically spaced horizontal drive shafts 2, 3 disposed at opposite sides of the comparatively heavy rolled section or work R. The outwardly extending ends of the shafts 2, 3 respectively mount two coplanar links 4, 5 the free ends of which carry substantially radially extending removable cutting or shearing knives 20, 20a shown in FIGS. 2, 5 and 6. The exact configuration of these knives 20, 20a forms no part of my present invention; for example, these knives may be of the parting, splitting, angle, or billet type, depending on the configuration of the rolled section which is to be sheared during its passage between the free ends of the links 4, 5.

The frame 1 also supports two additional rotary shafts, 10, 11 respectively disposed at the upper side and at the underside of the rolled section R. The driven shaft 10 is operatively connected with the drive shaft 2 by means of a gear transmission 12, 13, 14 shown in FIGS. 3 and 4, and a similar transmission is installed between the lower drive shaft 3 and the driven shaft 11. The means for driving the shaft 2 comprises an output shaft 2a shown in FIGS. 3 to 6 which is connected to a suitable electric motor M, an internal combustion engine or any other source of power, a variable speed transmission T, and a clutch assembly 15, also shown in FIGS. 3 to 6, which may be operated manually by a handle 17. The means for driving the lower drive shaft 3 comprises an output shaft 3a, a driving connection between the transmission T and the shaft 3a, and a clutch assembly 16 which latter may be operated by a handle 18.

The outwardly extending ends of the driven shafts 10, 11 are connected with two links 8, 9, respectively, and the means 12–14 which respectively transmit motion from the shafts 2, 3 to the shafts 10, 11 are constructed and assembled in such a way that the rotational speed of all four shafts is the same, i.e. the pivotal movements of the links 4, 8 and 5, 9 are fully synchronized. The links 4, 8 and 5, 9 are preferably disposed in a common plane (see FIGS. 5 and 6). The free ends of the upper links 4, 8 are releasably connected with the ends of a connecting link or rod 6 which carries a cutting knife 19. Analogously, the free ends of the lower links 5, 9 are releasably connected with the ends of a second connecting link or rod 7 which carries a complementary cutting or shearing knife 19a adapted to cooperate with the knife 19 to form a transverse cut in the rolled section R. The common plane of the links 6, 7 is adjacent to the common plane of the links 4, 5, 8, 9.

The operation of the shearing machine S is as follows:

It is assumed that the output shafts 2a, 3a are driven at a given rate of speed and that the clutch assemblies 15, 16 are in their idle positions shown in FIG. 6. The shafts 2, 3 are then idle and the links 4, 6, 8 and 5, 7, 9 respectively assume their phantom-line positions 4', 6', 8' and 5', 7', 9' which are shown in FIG. 1. The rolled section R is free to advance between the spaced knives 19, 19a which then assume the positions 19', 19a', respectively. The section R is assumed to move in the direction indicated by the arrow X. If it is now desired to form a transverse cut in the section R, the operator swings the handles 17, 18 to move the clutch assemblies 15, 16 to their operative positions which are shown in FIG. 5 so that the shafts 2, 10 and 3, 11 begin to rotate but in opposite directions. Thus, the shafts 2, 10 will rotate in clockwise directions indicated in FIG. 1 by the arrows Y, and the shafts 3, 11 will turn in anticlockwise directions (arrows Z). The swinging links 4, 8 and 5, 9 then begin to move the connecting links 6, 7 from their phantom-line positions 5', 7' toward the respective full-line positions of FIG. 1, and thereby cause the cutters 19, 19a to move toward each other and to perform the shearing operation. It will be readily understood that the speeds of shafts 2, 3, 10 and 11 and the speed of the section R (in the direction of the arrow X) are selected by the transmission T in such a way that, during their engagement with the rolled section, the cutters 19, 19a do not perform any longitudinal but only transverse movements with respect thereto. When the cutters 19, 19a reach their full-line position of FIG. 1, the cut in the rolled section R is completed, and the connecting links then preferably continue their movement in a direction to the left of FIG. 1 so as to move the cutters 19, 19a away from the rear portion of the sheared section R whereby the section is free to continue its movement in the direction indicated by the arrow X. Of course, the clutch assemblies 15, 16 are disconnected before the revolving shafts 2, 10 and 3, 11 can perform a complete revolution which would bring the cutters 19, 19a into renewed contact with the rolled section.

It will be noted that the links 4, 6, 8 and 5, 7, 9 actually form two parallel motion mechanisms wherein each of the links 6, 7 moves in parallelism with itself toward and away from the section R when the shafts 2, 10 and 3, 11 rotate. Therefore, the cutters 19, 19a may remain substantially perpendicular to the plane of the section R and will form a clean and straight cut, particularly since they do not slide longitudinally with respect to the section during an actual cutting or shearing operation. The pairs of parallel links 4, 8 and 5, 9 rotate about fixed axes which respectively coincide with the axes of shafts 2, 10 and 3, 11. The connecting links 6, 7 are substantially parallel with the plane of the workpiece R.

Of course, if it is desired to cut the rolled section R into shorter sections of equal length, the clutch assemblies 15, 16 may remain in their respective operative positions so that the shafts 2, 10 and 3, 11 may rotate without interruption to thereby move the connecting links 6, 7 toward and away from the advancing rolled section at desired intervals whose length depends on the rotational speed of the output shafts 2a, 3a and on the desired length of the sections between the successive cuts. Also, and as indicated schematically by a line 21 in FIGS. 5 and 6, the handles 17, 18 may be connected with each other so that the clutch assemblies 15, 16 may be moved simultaneously into and from their operative positions.

As is clearly shown in FIGS. 2, 5 and 6, the links 5, 7 and 4, 6 are connectable with trunnions 24 extending beyond the outer sides of the links 4, 8 and 5, 9 so that the pivotable links and their shafts are not obstructed and may perform full revolutions, if desired.

FIG. 2 illustrates the shearing machine S in the form it assumes when used for the cutting of comparatively light rolled sections Ra. The connecting links 6, 7 are removed and the section Ra of comparatively small cross-sectional area is assumed to advance in the direction of the arrow Xa. Before the start of a cutting operation, the links 4, 5 are assumed to be in their phantom-line positions 4", 5", respectively, i.e. the cutters 20, 20a are moved into the positions 20", 20a" (see also FIG. 1) and are not in the path of the advancing section Ra. The operator then actuates the handles 17, 18 to move the clutch assemblies 15, 16 into the operative positions shown in FIG. 5 so that the links 4, 5 begin to rotate in opposite directions indicated in FIG. 2 by the arrows Ya, Za, respectively. While moving from their phantom-line positions 20", 20a" to the full-line positions of FIG. 2, the cutters 20, 20a engage the rolled section Ra and form a transverse cut therein to thereupon continue their movement about the shafts 2, 3 in order to move from the path of the rear part of the section which is thus free to continue its movement in the direction indicated by the arrow Xa. The links 8, 9 also rotate about their respective shafts 10, 11 without, however, contributing to the shearing action of the cutters 20, 20a. Of course, and as indicated by the arrow 22 in FIG. 4, the intermediate gears 13 of the transmissions which connect the shafts 2, 10 and 3, 11 may be shifted alone or with their shafts 23 so that the gears 14 on the shafts 10, 11 are disconnected from the gears 12 on the shafts 2, 3 and the links 8, 9 will assume their positions of FIG. 2 merely under the action of gravity.

It will be seen that, for the shearing of a comparatively strong section R with a larger cross-sectional area, the mass connected with the cutters 19, 19a is increased considerably by the addition of connecting links 6, 7 and by the connection of these links with the links 8, 9, respectively. On the other hand, the mass of the links 4, 5 is sufficient for the shearing of comparatively light rolled sections Ra by the cutters 20, 20a. The cutters 20, 20a extend substantially radially with respect to the axes of the shafts 2, 3 and, therefore, these cutters will change their angular positions during the shearing operation (i.e. while they advance from the positions 20″, 20a″ to the full-line positions of FIG. 2). This is normally of lesser importance in the cutting of a light rolling section. In fact, and as clearly shown in FIG. 5, the machine of my invention may be used for simultaneous cutting of light and heavier rolled sections because the cutters 20, 20a are adjacent to and do not interfere with the cutters 19, 19a. The front face of the frame 1 is formed with a cut-out 1a which is provided with a view to allow the passage of one or more sections while a further section passes between the cutters 19, 19a and/or 20, 20a. It will be noted that the cutters 19, 19a and 20, 20a are removably secured to their respective links.

The provision of readily separable connecting links 6, 7 and of permanently installed links 8, 9 is of considerable advantage because the machine S may be very rapidly adapted for the shearing of all types of stock. It is well known that any changes in the rolling schedule of a modern rolling mill must be carried out with no or with little losses in time so as to minimize production losses and to contribute to a lower cost of the rolled material.

The weight of the links 5, 7 and 6, 8 may be selected at will and, if desired, several sets of such links in different weight ranges may be provided in order to insure that the shearing machine is capable of performing cutting operations on all types of rolled sections beginning with extremely light sections and up to rolled sections of very large cross-sectional area.

It goes without saying that, by using a reversible motor M, the shearing machine may be put to use regardless of the direction in which the sections R and Ra advance, i.e. in or counter to the direction of the arrows X and Xa. When the machine S is used for the cutting of heavy workpieces with comparatively large cross-sectional area, the transmission T is preferably of the infinitely variable type, particularly if the rolling line with which the machine S cooperates has an extensive rolling schedule.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a shearing machine for moving workpieces, particularly for rolled sections in rolling mills, in combination, a first parallel motion mechanism disposed at one side of a moving workpiece; a second parallel motion mechanism disposed at the other side of the workpiece, each said mechanism comprising a pair of first links each having a first end rotatable about a fixed axis and a second end which is more distant from the respective axis, and a connecting link removably connected with the second ends of said first links; cooperating first cutter means connected with each of said connecting links and extending substantially transversely of the workpiece to perform translatory movements with the connecting links in response to rotation of said first links; cooperating second cutter means rigidly connected with the second end of one of each pair of said first links so as to orbit about the respective axes in response to rotation of the corresponding first links; and means for rotating the first links of said first and second mechanisms in opposite directions whereby the connecting links and said first cutter means are moved in parallelism with themselves and the first cutter means form a transverse cut in a workpiece located therebetween, said second cutter means adapted to form a cut in a workpiece located therebetween independently of said first cutter means when said one of each pair of first links is rotated.

2. In a shearing machine for moving workpieces, particularly for rolled sections in rolling mills, in combination, a first parallel motion mechanism disposed at one side of a moving workpiece; a second parallel motion mechanism disposed at the other side of the workpiece, each said mechanism comprising a pair of first links each having a first end rotatable about a fixed axis and a second end more distant from the respective axis, and a connecting link removably connected with the second ends of said first links; first cutter means rigidly connected with the second end of one first link of said first mechanism and complementary second cutter means rigidly connected with the second end of one first link of said second mechanism; third cutter means rigidly connecting with the connecting link of said first mechanism in the proximity of said first cutter means and complementary fourth cutter means rigidly connected with the connecting link of said second mechanism in the proximity of said second cutter means; and means for rotating the first links of said first and second mechanisms in opposite directions, said first and second cutter means forming a transverse cut in a workpiece moving therebetween when said one first link of each mechanism rotates, and said third and fourth cutter means forming a transverse cut in a workpiece moving therebetween when said connecting links are connected with the respective first links and said first links rotate.

3. In a shearing machine for the cutting of workpieces moving along a predetermined plane, particularly for rolled sections in rolling mills, in combination, a first parallel motion mechanism disposed at one side of a moving workpiece; a second parallel motion mechanism disposed at the other side of the workpiece, each said mechanism comprising a pair of first links parallel to each other and each having a first end rotatable about a fixed axis and a second end more distant from the respective axis, and a connecting link removably connected with the second ends of said first links, said connecting links being substantially parallel to said predetermined plane; complementary first and second cutter means rigidly connected with the second end of one first link of said first and second mechanism respectively; complementary third and fourth cutter means rigidly connected with the connecting links of said first and second mechanism in the proximity of said first and second cutter means, respectively; and driving means for rotating the first links of said first and second mechanisms in opposite directions, said driving means comprising a first and a second drive shaft respectively connected to said one first link of said first and second mechanism, an output shaft for each drive shaft, a source of power for rotating said output shafts, and clutch means disposed between each output shaft and each drive shaft, said first and second cutter means forming a transverse cut in a workpiece moving therebetween when said one first link of each mechanism rotates, and said third and fourth cutter means forming a cut in a workpiece moving therebetween when said connecting links are connected with the respective first links and said first links rotate.

4. In a shearing machine for moving workpieces, particularly for rolled sections in rolling mills, in combination, a first parallel motion mechanism disposed at one side of a moving workpiece; a second parallel motion mechanism disposed at the other side of the workpiece, each said mechanism comprising a pair of first links each having a first end rotatable about a fixed axis and a second end more distant from the respective axis, and a connecting link removably connected with the second ends of said first links; complementary first and second cutter means rigidly connected with the second end of one first link of said first and second mechanism respectively; complementary third and fourth cutter means rigidly connected with the connecting links of said first and second mechanism in the proximity of said first and second cutter means, respectively; and driving means for rotating the first links of said first and second mechanisms in opposite directions, said driving means comprising a first and a second drive shaft respectively connected to said one first link of said first and second mechanism, a driven shaft connected with the other first link of each mechanism, first and second transmission means operatively connected between the drive shaft and the driven shaft of said first and second mechanism, respectively, an output shaft for each drive shaft, a source of power for rotating said output shafts, variable speed transmission means mounted between said source and said output shafts, and clutch means disposed between each output shaft and each drive shaft, said first and second cutter means forming a transverse cut in a workpiece moving therebetween when said one first link of each mechanism rotates, and said third and fourth cutter means forming a cut in a workpiece moving therebetween when said connecting links are connected with the respective first links and said first links rotate.

5. In a shearing machine for the cutting of workpieces moving along a predetermined path, particularly for rolled sections in rolling mills, in combination, a first parallel motion mechanism disposed at one side of a moving workpiece; a second parallel motion mechanism disposed at the other side of the workpiece, each said mechanism comprising a pair of coplanar first links each having a first end rotatable about a fixed axis and a second end more distant from the respective axis, and a connecting link removably connected with the second ends of said first links, said connecting link being disposed in a plane adjacent to the common plane of said first links; complementary first and second cutter means rigidly connected with the second end of one first link of said first and second mechanism respectively, said cutter means extending substantially transversely of said path when cutting a workpiece and substantially radially to the fixed axis of the respective first link; complementary third and fourth cutter means rigidly connected with the connecting links of said first and second mechanism in the proximity of said first and second cutter means, respectively, said third and fourth cutter means extending transversely of said path; and driving means for rotating the first links of said first and second mechanisms in opposite directions, said driving means comprising a first and a second drive shaft respectively connected to said one first link of said first and second mechanism, an output shaft for each drive shaft, a source of power for rotating said output shafts, and clutch means disposed between each output shaft and each drive shaft, said first and second cutter means forming a transverse cut in a workpiece moving therebetween when said one first link of each mechanism rotates, and said third and fourth cutter means forming a cut in a workpiece moving therebetween when said connecting links are connected with the respective first links and said first links rotate.

6. In a shearing machine for moving workpieces, particularly for the shearing of rolled sections in rolling mills, in combination, frame means; a first drive shaft rotatably mounted in said frame means at one side of a moving workpiece; a second drive shaft parallel with said first drive shaft and rotatably mounted in said frame at the other side of the workpiece; a first crank arm having a first end connected with said first shaft for rotation therewith and a second end; a second crank arm having a first end connected with said second shaft for rotation therewith and a second end; first and complementary second cutter means rigidly connected with the second ends of said first and second crank arms and extending transversely of the workpiece; a third shaft rotatably mounted in said frame at one side of the workpiece and parallel with said first shaft; a fourth shaft rotatably mounted in said frame at the other side of the workpiece and parallel wtih said second shaft; a third crank arm having a first end connected with said third shaft for rotation therewith and a second end; a fourth crank arm having a first end connected with said fourth shaft for rotation therewith and a second end, said third and fourth crank arms being respectively parallel with said first and second crank arms; a first connecting link having a first and a second end removably connected with the second ends of said first and third crank arms, respectively; a second connecting link having a first and a second end removably connected with the second ends of said second and fourth crank arms, respectively; third and complementary fourth cutter means rigidly connected to the first ends of said first and second connecting links respectively and extending transversely of the workpiece; and means for driving said first and second shafts in opposite directions whereby, when said connecting links are disconnected from said first and third and from said second and fourth crank arms and a workpiece is moved between said first and second cutter means, said first and second cutter means are moved by said first and second crank arms in a rotary motion and into shearing contact with the moving workpiece when said first and second shafts rotate and, when said connecting links are connected with said first and third and with said second and fourth crank arms, respectively, and a workpiece is moved between said third and fourth cutter means, said third and fourth cutter means are moved in a translatory motion and into shearing contact with the last-mentioned workpiece when said shafts rotate.

7. In a shear for the cutting of traveling material such as rolled sections having different cross-sectional areas, in combination, first cutter means mounted for performing a rotary motion in an orbit about a fixed axis; second cutter means mounted for performing a translatory motion in an orbit about the same fixed axis; and means for causing one of said cutter means to perform a cut when the other of said cutter means is inactive, whereby material of relatively small cross-sectional area may be severed by said first, rotary cutter means of said shear and material of larger cross-sectional area by said second, translational cutter means of said same shear.

8. In a shear for the cutting of traveling material such as rolled sections, in combination, first cutter means for severing material of relatively small cross-sectional area; second cutter means for severing material of larger cross-sectional area; principal mechanism comprising a predetermined mass of parts for imparting to said first cutter means rotary motion in an orbit about a fixed axis; complementary mechanism comprising an additional mass of parts connectible to and disconnectible from said principal mechanism and adapted to cooperate therewith for imparting to said second cutter means translatory motion in an orbit about the same fixed axis; and means for actuating said first cutter means when said mechanisms are disconnected from each other and for actuating said second cutter means when said mechanisms are interconnected, whereby the mass of parts to be moved for severing said material of relatively small cross-sectional area is reduced as compared with the mass of parts to be moved for severing said material of larger cross-sectional area on said shear.

9. In a shear for the cutting of traveling material such as rolled sections, in combination, first cutter means for severing relatively thin material; second cutter means for severing thicker material, said second cutter means being laterally offset in respect of said first cutter means; principal mechanism for imparting to said first cutter means rotary motion in an orbit about a fixed axis; complementary mechanism releasably connectible to said principal mechanism so as to cooperate therewith for imparting to said second cutter means translatory motion in an orbit about the same fixed axis; and driving means operable to actuate said principal mechanism and first cutter means alone at speeds in a predetermined range and to actuate both of said mechanisms when said complementary mechanism is connected with said principal mechanism as well as to actuate said first and second cutter means at lower speeds, whereby relatively thin, rapidly traveling material may be severed by said first cutter means of said shear and relatively thick material traveling at a lower rate of speed may be severed by said second cutter means on said same shear.

References Cited in the file of this patent

UNITED STATES PATENTS

| | | |
|---|---|---|
| 1,913,153 | De Salardi | June 6, 1933 |
| 2,067,509 | Smitmans | Jan. 12, 1937 |

FOREIGN PATENTS

| | | |
|---|---|---|
| 848,815 | France | Nov. 7, 1939 |
| 904,847 | Germany | Feb. 22, 1954 |
| 1,051,613 | Germany | Feb. 26, 1959 |